(12) United States Patent  (10) Patent No.: US 8,131,947 B2
Moyer  (45) Date of Patent: Mar. 6, 2012

(54) CACHE SNOOP LIMITING WITHIN A MULTIPLE MASTER DATA PROCESSING SYSTEM

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 778 days.

(21) Appl. No.: 12/201,216

(22) Filed: Aug. 29, 2008

(65) Prior Publication Data

US 2010/0057997 A1  Mar. 4, 2010

(51) Int. Cl.
G06F 13/376 (2006.01)
(52) U.S. Cl. ........................................... 711/146
(58) Field of Classification Search ................ None
See application file for complete search history.

(56) References Cited

U.S. PATENT DOCUMENTS

| | | | |
|---|---|---|---|
| 4,096,571 A * | 6/1978 | Vander Mey | 711/151 |
| 5,426,765 A | 6/1995 | Stevens et al. | |
| 5,506,971 A * | 4/1996 | Gullette et al. | 710/116 |
| 5,652,859 A | 7/1997 | Mulla et al. | |
| 5,893,151 A | 4/1999 | Merchant | |
| 5,920,892 A | 7/1999 | Nguyen | |
| 6,029,204 A | 2/2000 | Arimilli et al. | |
| 6,073,212 A | 6/2000 | Hayes et al. | |
| 6,175,930 B1 | 1/2001 | Arimilli et al. | |
| 6,253,291 B1 | 6/2001 | Pong et al. | |
| 6,594,734 B1 | 7/2003 | Kyker et al. | |
| 6,668,309 B2 | 12/2003 | Bachand et al. | |
| 6,907,502 B2 | 6/2005 | Augsburg et al. | |
| 7,818,511 B2 | 10/2010 | Goodman et al. | |
| 2003/0005236 A1 | 1/2003 | Arimilli et al. | |
| 2006/0004965 A1 | 1/2006 | Tu et al. | |
| 2006/0224835 A1 | 10/2006 | Blumrich et al. | |

FOREIGN PATENT DOCUMENTS

WO  9932976  7/1999

OTHER PUBLICATIONS

U.S. Appl. No. 11/969,112, filed Jan. 3, 2008.
U.S. Appl. No. 12/053,761, filed Mar. 24, 2008.
U.S. Appl. No. 12/112,796, filed Apr. 30, 2008.
Office Action mailed Aug. 4, 2011 in U.S. Appl. No. 12/201,225.
Office Action mailed Jul. 5, 2011 in U.S. Appl. No. 12/201,272.
Notice of Allowance mailed Jul. 27, 2011 in U.S. Appl. No. 12/201,228.
Non Patent Literature document uploaded Jul. 27, 2011 in U.S. Appl. No. 12/201,228.

* cited by examiner

Primary Examiner — Duc Doan
(74) Attorney, Agent, or Firm — Joanna G. Chiu; Robert L. King

(57) ABSTRACT

In a data processing system, access to a cache in response to access requests from first processing circuitry and snoop requests resulting from a transaction performed by second processing circuitry are arbitrated. Accesses to the cache are monitored to determine if the first processing circuitry is prevented from accessing the cache for more than a threshold amount of time. A signal is generated to indicate when the first processing circuitry has been prevented from accessing the cache for more than the threshold amount of time.

17 Claims, 8 Drawing Sheets

US 8,131,947 B2

CACHE SNOOP LIMITING WITHIN A MULTIPLE MASTER DATA PROCESSING SYSTEM

CROSS-REFERENCE TO RELATED APPLICATION(S)

This application is related to U.S. application Ser. No. 12/201,225, filed on even date, entitled "Snoop Request Arbitration in a Data Processing System," naming William C. Moyer and Quyen Pho as inventors, and assigned to the current assignee hereof and U.S. application Ser. No. 12/201,272 filed on even date, entitled "Snoop Request Arbitration in a Data Processing System," naming William C. Moyer and Quyen Pho as inventors, and assigned to the current assignee hereof.

BACKGROUND

1. Field

This disclosure relates generally to data processing systems, and more specifically, to snoop limiting within a multiple master data processing system.

2. Related Art

Some data processing systems use multiple processors with closely coupled cache memories. A cache memory stores a subset of duplicative information that is stored in the system memory. Using a cache in the system may reduce the number of occurrences that a processor must communicate with the system memory via a system interconnect. However, the presence of various caches (or other memory devices) in a system can readily permit a data operand which has the same identifier or address to be present at various locations in the system. When the data operand is modified in one part of the system, an opportunity exists that an old version of the data operand will be stored or used. Memory coherency refers to the need of each processor in a multiple master data processing system to have access to the most recently modified data corresponding to a particular address in the memory system. The presence of differing data values for a same address value in a data processing system may lead to system errors.

To maintain memory coherency, reads and writes of information to the system memory are monitored or "snooped". When either a memory read or a memory write of data at an address is detected, this address of the transaction is used as a snoop address. A snoop request is initiated and directed to all caches in the system such that snoop lookups can be performed to search for any address in the caches that match the snoop address. A snoop hit occurs for every match, and any needed corrective action is taken to maintain coherency of the data at the address in the cache where the snoop hit occurs.

For a processor cache with a single set of tags, arbitration is needed between processor requests to search for addresses in its own cache (such as for performing a load or store instruction whose corresponding access address may be contained in the cache) and snoop requests to perform snoop lookups in the cache. In one arbitration solution used today, any pending snoop request blocks the processor from accessing its cache for one or more cycles. If snoop lookups occur frequently, then processor performance may be negatively impacted.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one embodiment, any pending snoop requests are provided access to the cache, even when a processor has pending access requests for the cache. In one embodiment, the access demands on the cache are balanced by load-leveling conflicting requests. In one embodiment, once a processor has been stalled beyond an acceptable or predetermined threshold, an indication of such is provided to cache coherency logic. With this indication, the cache coherency logic can control or limit the number of snoop requests provided to the processor so as to allow the processor greater access to the cache.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Figure 1:
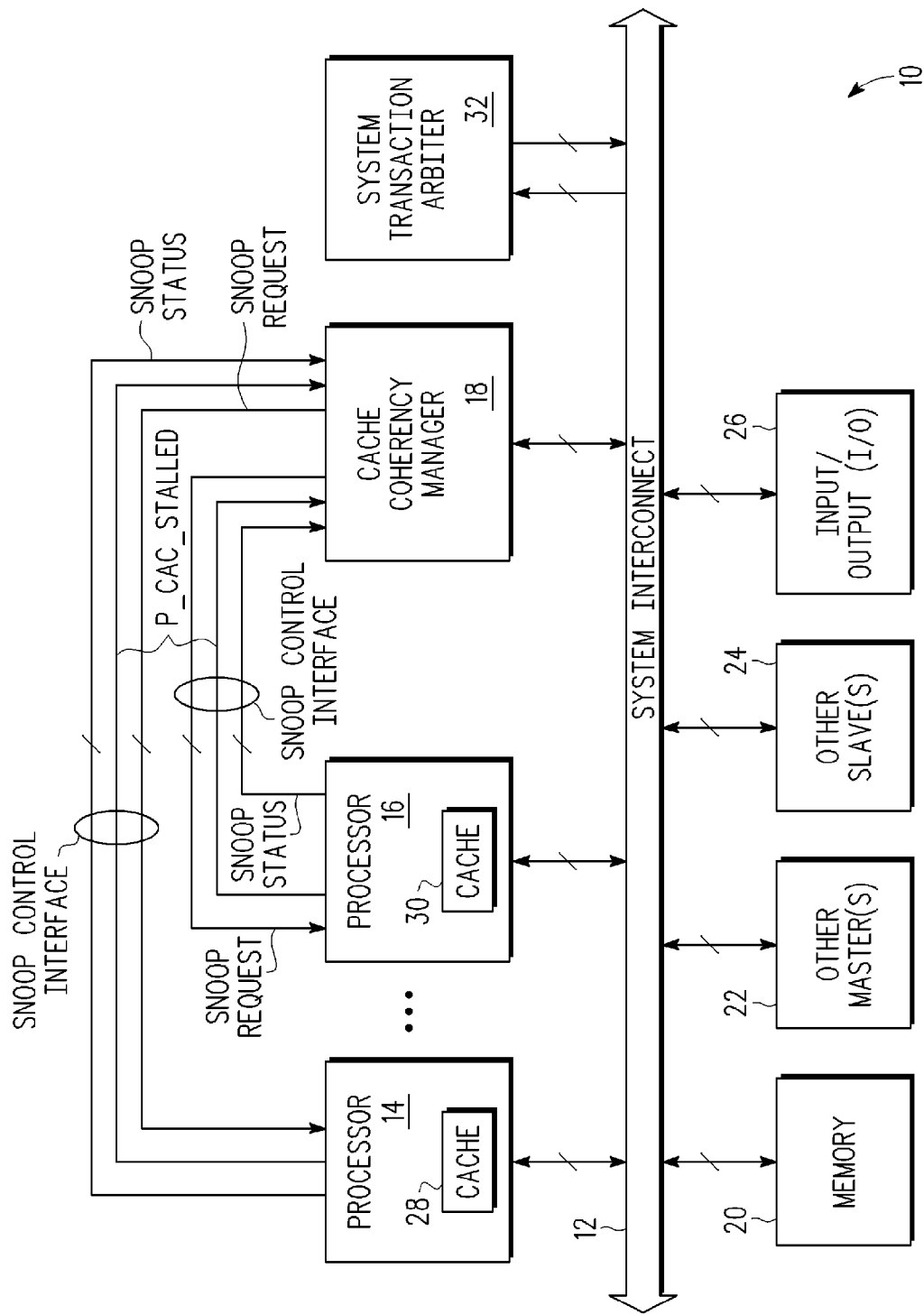
FIG. 1 is a block diagram of a data processing system according to one embodiment of the present invention.

FIG. 1 illustrates, in block diagram form, a data processing system 10 according to one embodiment of the present invention. Data processing system 10 includes processor 14, processor 16, cache coherency manager 18, system transaction arbiter 32, system memory 20, other master devices 22, other slave devices 24, and input/output (I/O) devices 26. The devices shown in FIG. 1 are communicatively coupled to a system interconnect 12 but maybe coupled by other types of system interconnects in other embodiments. For example, the devices shown may be communicatively coupled by a system interconnect that includes a cross bar switch or other type of switch, or a system interconnect that includes multiple busses and/or switches. In one embodiment, a system interconnect may include multiple signal lines for address, data, and control information.

System transaction arbiter 32 arbitrates among various masters of system 10 for transactions on a system interconnect 12. I/O devices 26 may be any number of I/O devices such as keyboard controllers and communications ports. Other slave devices 24 may include memory devices such as a system cache (e.g. L2 cache). Both devices 24 and 26 may be accessible by transactions on system interconnect 12 that are generated by the master devices of the system (e.g. processor 14, processor 16, or other master devices 22). In one embodiment, other master devices 22 includes other types of processors (e.g. a digital signal processor) or a direct memory access (DMA) device which can generate transactions on system interconnect 12. In one embodiment, each master device may also include a cache (not shown).

System 10 includes a cache coherency manager 18 (which may also be referred to as cache coherency logic) that snoops system interconnect 12 for transactions and initiates snoop requests for various caches of system 10 (e.g. cache 28, cache 30) to determine whether the caches include the data operand (e.g. access address) of the transaction. In one embodiment, if a cache contains the data operand, then that cache will invalidate the data operand in response to the snoop request. Alternate embodiments may maintain coherency in response to snoop requests in other ways.

One example of a snoopable transaction is a write transaction by processor 16 to system memory 20 for writing data to a location in memory 20. In response to the transaction, cache coherency manager 18 would generate a snoop request to the other caches (e.g. cache 28) to search for data of the same memory address. If a cache has an entry corresponding to the same memory address, then in one embodiment, the cache would invalidate that data since an updated version is being provided to memory 20 on system interconnect 12. An alternate embodiment may respond to the snoop transaction in an alternate manner, such as sourcing the write data to the cache and updating the cache entry with the new data if a matching entry is found.

In the embodiment shown, system 10 includes a snoop control interface between the cache coherency manager 18 and each of the processors 14 and 16 for exchanging information regarding snooping operations. In the embodiment shown, the snoop control interface includes snoop request lines, snoop status lines, and a processor cache access stall indicator (p_cac_stalled). Alternate embodiments may include more or different lines or signals within the snoop control interface. These lines will be discussed below. In the embodiment shown, cache coherency manager 18 only includes snoop control interfaces with processors 14 and 16. However, in other embodiments, cache coherency manager 18 may include a snoop control interface with other devices having a cache (e.g. master devices 22, slave devices 24, and other caches). In alternative embodiments, processors 14 and 16 may include additional caches.

In other embodiments, other types of data systems may include different configurations and/or have additional circuitry. Also, other embodiments may not have all of the circuitry shown in FIG. 1. In one embodiment, some or all of the circuitry shown in FIG. 1 may be implemented on one integrated circuit. However, in other embodiments, system 10 may be implemented with multiple integrated circuits.

In one embodiment, system 10 may be implemented as part of an information system such as e.g. a computer, cell phone, PDA, electronic control circuitry of an automobile, or other type of system implementing a data processing system.

Figure 2:
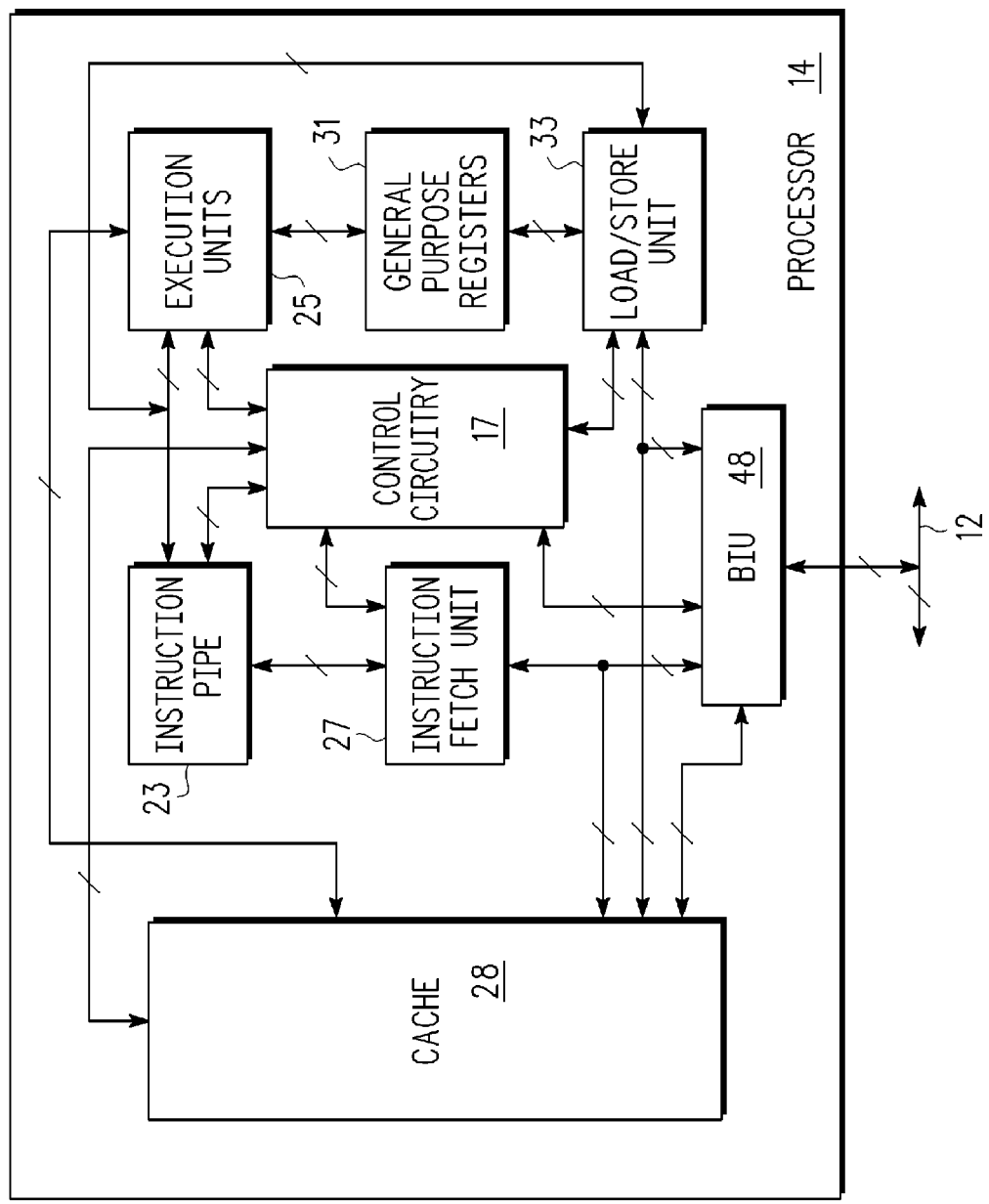
FIG. 2 is a block diagram of one embodiment of a portion of a processor according to one embodiment of the present invention.

Illustrated in FIG. 2 is a portion of processor 14 which further details the control circuitry within processor 14 between cache 28 and a bus interface unit (BIU) 48. Elements which are common with those of FIG. 1 are numbered the same in FIG. 2. BIU 48 is connected to system interconnect 12 and to cache 28 as previously described. A second input/output terminal of BIU 48 is connected to a fifth input/output terminal of cache 28 and to a first input/output terminal of instruction fetch unit 27. A third input/output terminal of BIU 48 is connected to a first input/output terminal of control circuitry 17. A fourth input/output terminal of BIU 48 is connected to a sixth input/output terminal of cache 28 and to a first input/output terminal of a load/store unit 33. A second input/output terminal of the instruction fetch unit 27 is connected to a first input/output terminal of an instruction pipe or instruction pipeline 23. A second input/output terminal of instruction pipeline 23 is connected to a first input/output terminal of execution units 25. Execution units 25 generally include units such as a floating point unit, an integer unit and other processing units. A third input/output terminal of instruction pipeline 23 is connected to a second input/output terminal of control circuitry 17. A third input/output terminal of instruction fetch unit 27 is connected to a third input/output terminal of control circuitry 17. A fourth input/output terminal of cache 28 is connected to a fourth input/output terminal of control circuitry 17. A fifth input/output terminal of control circuitry 17 is connected to a second input/output terminal of execution units 25. A third input/output terminal of execution units 25 is connected to the second input/output terminal of cache 28. A fourth input/output terminal of execution units 25 is connected to a first input/output terminal of general purpose registers (GPRs) 31. A second input/output terminal of general purpose registers 31 is connected to a second input/output terminal of load/store unit 33. A third input/output terminal of load/store unit 33 is connected to the second input/output terminal of instruction pipeline 23 and to the first input/output terminal of execution units 25. A fourth input/output terminal of load/store unit 33 is connected to a sixth input/output terminal of control circuitry 17.

In operation, control circuitry 17 of processor 14 functions to control and coordinate BIU 48 and cache 28 operations as well as the instruction fetch, decode and various execution units of processor 14. Under control of control circuitry 17, instructions are coupled via BIU 48 or cache 28 into the instruction fetch unit 27 and placed in the instruction pipeline 23. The instructions are executed by execution units 25 and results are stored off in GPRs 31. Load/store unit 33 operates under control of control circuitry 17 to load information needed for processing by execution units 25 and to store information from GPRs 31 to/from cache 28 and/or system interconnect 12. Therefore, the portion of processor 14 detailed in FIG. 2 illustrates the instruction execution operation of processor 14 separate from the cache coherency management function.

Figure 3:
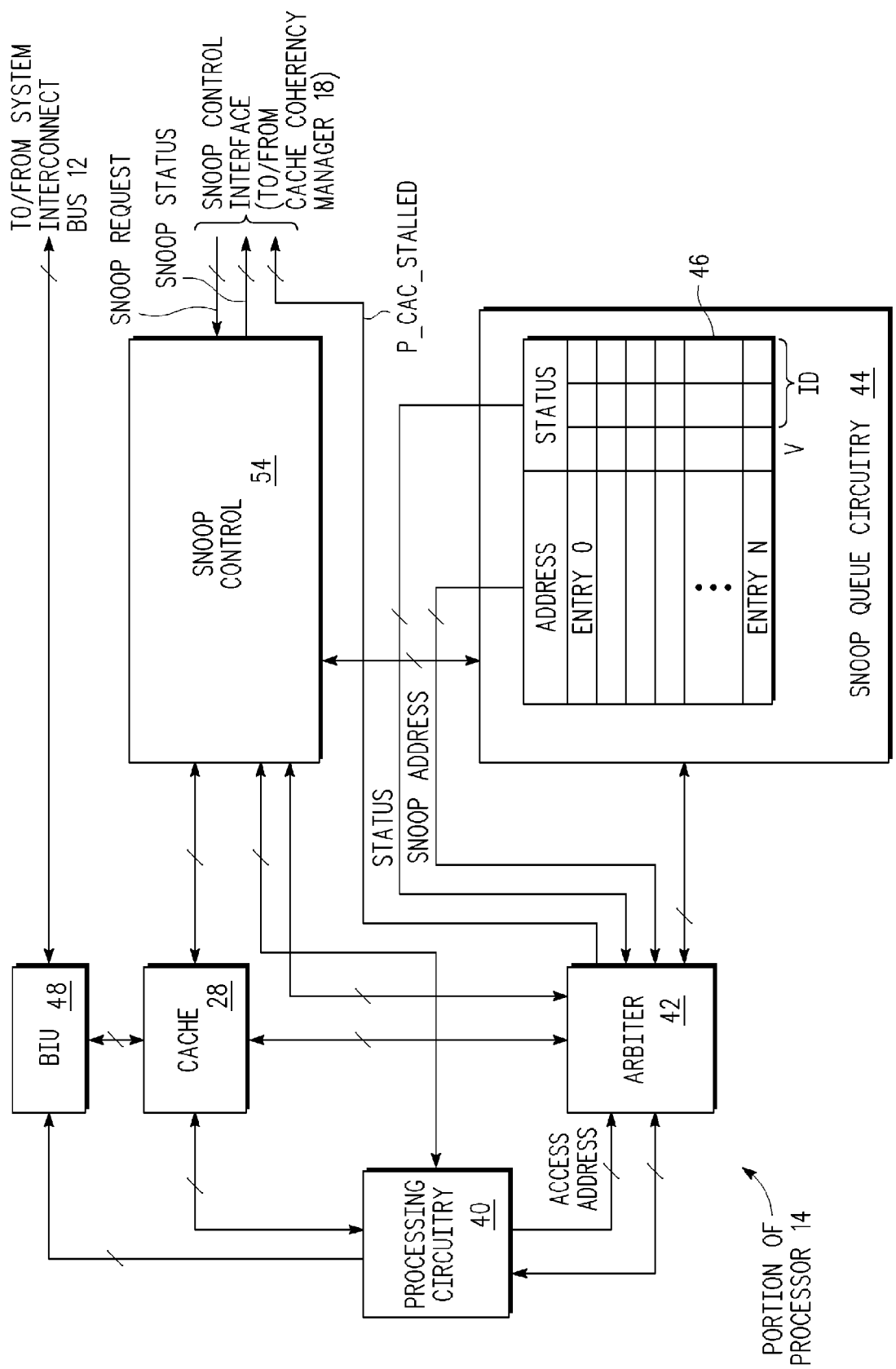
FIG. 3 is a block diagram of a portion of a processor according to one embodiment of the present invention.

Illustrated in FIG. 3 is further detail of a portion of processor 14 which further details cache 28 and associated cache snooping circuitry, in accordance with one embodiment of the present invention. Reference elements illustrated in FIG. 3 that are common with reference elements of FIGS. 1 and 2 are numbered the same. BIU 48 has a first input/output terminal connected via a bidirectional multiple-bit conductor to system interconnect 12. Processing circuitry 40 of processor 14 has a first output that is connected to an input of BIU 48. A second input/output terminal of BIU 48 is connected to a first input/output terminal of cache 28. A second input/output terminal of cache 28 is connected via a bidirectional multiple-bit conductor to a first input/output terminal of processing circuitry 40. A third input/output terminal of cache 28 is connected via a bidirectional multiple-bit conductor to a first input/output terminal of an arbiter 42. A fourth input/output terminal of cache 28 is connected to a first input/output terminal of snoop control 54. A second output of processing circuitry 40 is connected to a first input of arbiter 42 for providing an access address. A second input/output terminal of processing circuitry 40 is connected to a second input/output terminal of arbiter 42. Snoop control 54 has a second input/output terminal connected to a third input/output terminal of the arbiter 42. A third input/output terminal of snoop control 54 is connected to a third input/output terminal of processing circuitry 40. An output of snoop control 54 provides a snoop status signal, and in input of snoop control 54 receives a snoop request signal, both of which may be considered part of the snoop control interface. Snoop queue circuitry 44 has a first output connected to a second input of arbiter 42 for providing a snoop address from the stored (N+1) entries. A second output of snoop queue circuitry 44 is connected to a third input of the arbiter 42 for providing status information associated with each snoop address. This status information may be provided to indicate that the current snoop address is valid and that a request for snoop lookup to arbiter 42 is valid. A fourth input/output terminal of the arbiter 42 is connected to a first input/output terminal of snoop queue circuitry 44 for providing access control. This access control is used to handshake snoop requests and snoop grants and coordinates the operation of the snoop queue circuitry 44. A fourth input/output terminal of snoop control 54 is connected to a second input/output terminal of snoop queue circuitry 44 for providing snoop addresses from the system interconnect 12 to the snoop queue circuitry 44.

Processing circuitry 40 may include circuitry typically found in a processor such as e.g. an instruction pipe unit, execution units, an instruction fetch unit, control circuitry, general purpose registers, a load store unit, and a prefetch unit. For example, in one embodiment, processing circuitry 40 may include instruction pipe 23, instruction fetch unit 27, control circuitry 17, execution units 25, GPRs 31, and load/store unit 33, of FIG. 2. Processors of other embodiments may include other types of circuitry.

In one embodiment, during processor operations, processing circuitry 40 executes instructions that generate requests for data to be read from system memory 20 (or other slave or I/O devices) and for data to be written to system memory 20 (or other slave or I/O devices). In response to a request for data having a system memory address (e.g. generated by load/store unit 33 or prefetch unit 27) processing circuitry 40 will check cache 28 (via arbiter 42) to see if it has any data that corresponds to that system memory address. If not, load/store unit 33 of processing circuitry 40 may generate via BIU 48 a transaction on system interconnect 12 to request data from memory 20 at that system address. In response to the read transaction, the system memory 20 will provide the requested data on system interconnect 12 to processor 14 where BIU 48 receives the data and provides the data to processing circuitry 40 and to cache 28 in some embodiments. After receiving the data by processor 14, the transaction is complete. Write transactions to memory 20 can be initiated by processor 14 where a write address and data are provided on interconnect 12 to be written to memory 20 at the address. Also, data may be written to or read from other slave devices 24 and I/O devices 26 of data processing system 10 in other embodiments.

Cache 28 may be an instruction cache, a data cache, or a combination of the two. The use of the term "data" herein in regards to a transaction may refer to the information stored in either an instruction cache or a data cache.

Processor 14 also includes circuitry for snoop request management. The snoop request circuitry operates to keep the data in cache 28 coherent with other copies of the data stored in memory 20 and other caches of data processing system 10. Snoop control 54 receives snoop requests from cache coherency manager 18 via the snoop control interface. Processor 14 includes snoop queue circuitry 44 including snoop queue 46 for storing snoop requests received from the snoop control interface. In one embodiment, snoop request queue 46 may be implemented as a first-in first-out buffer (FIFO). In one embodiment, the FIFO may be implemented as a circular buffer.

Within snoop request queue 46 is a plurality of (N+1) entries where N is an integer. Each entry in snoop request queue 46 has an address field and a status field that includes status information. The address field stores the address of the transaction for which a snoop request was generated. In the embodiment shown, a first status bit is a valid (V) bit which indicates whether the entry in snoop request queue 46 is valid. Other types of status bits may be included in other embodiments. In one embodiment, each entry also includes a snoop request ID field that stores the snoop request ID for the snoop request generated by the cache coherency manager.

In operation, snoop control 54 and snoop queue circuitry 44 operate to keep cache 28 coherent with other copies of the information in system 10. Snoop control 54 receives a snoop request from cache coherency manager 18 via the snoop control interface and provides the address of the snoop request, along with the request ID to be stored in snoop request queue 46. Therefore, in one embodiment, cache coherency manager 18 may be characterized as detecting possible incoherencies caused by at least one transaction between a processor and system memory 12 or within a processing and a cache. The snoop requests provided by cache coherency manager 18 to snoop control 54 may therefore arise from these possible incoherencies. In an alternate embodiment, the functionality of cache coherency manager 18 may be distributed within the different masters of system 10. For example, the functions may be performed within each of the processors 14-16. Also, in an alternate embodiment, a snoop queue may not be used such that snoop requests are provided directly from cache coherency manager 18, via snoop control 54, to arbiter 42.

When a snoop request is received by snoop control 54, snoop control 54 routes the snoop address to the snoop queue circuitry 44. Various embodiments of the function of snoop queue circuitry 44 may be implemented. In one embodiment, all received snoop addresses from snoop control 54 are stored in snoop request queue 46. When arbiter 42 provides snoop queue circuitry 44 with access to cache 28, access addresses from the processing circuitry 40 are not permitted to cache 28 via arbiter 42. In this mode of operation, arbiter 42 provides the snoop addresses from snoop request queue 46 to cache 28 for searching (i.e. for performing a snoop lookup operation). The snoop addresses are removed from the snoop request queue 46 on a first-in, first-out (FIFO) basis.

When a snoop address is present in snoop request queue 46, snoop queue circuitry 44 signals arbiter 42 to request arbiter 42 to arbitrate for access to cache 28. In one embodiment, cache 28 has a single set of address tags and therefore must be either be dedicated to the processor (i.e. processing circuitry 40) for addressing or to snoop queue circuitry 44 for addressing. When arbiter 42 prevents access by processing circuitry 40 to cache 28, snoop addresses from circuitry 44 are routed through arbiter 42 to cache 28. Circuitry within cache 28 performs a snoop look-up operation. The snoop-lookup operation includes comparing the snoop address with all the addresses presently stored in cache 28. If a match occurs, the matching entry in cache 28 is marked as invalid since it is potentially different from the entry of the transaction on system interconnect 12. If no match occurs, no further action is taken within cache 28. The hit determination, and the invalidating of the matching entry if a hit does occur may also be referred to as part of the snoop look-up operation. In some embodiments, snoop control 54 may signal arbiter 42 to arbitrate for access to cache 28. In other embodiments, alternate coherency operations other than invalidation of a matching cache entry on a snoop lookup may occur, such as changing the state of a matching cache entry, or updating a matching cache entry with the latest data.

Therefore, arbiter 42 arbitrates access to cache 28 between access addresses from processing circuitry 40 and snoop addresses from snoop queue circuitry 44. In one embodiment, processing circuitry 40 may signal to arbiter 40 for the need to access cache 28 by simply providing an access address to arbiter 42, which operates as a processing circuitry request for access to cache 28. Alternatively, a separate processing circuitry request signal may be provided from processing circuitry 40 to arbiter 42 to request access to cache 28 for a current access address. Similarly, in one embodiment, snoop queue circuitry 44 may signal to arbiter 40 for the need to access cache 28 by simply providing a snoop address to arbiter 42. Alternatively, a separate snoop circuitry access request signal may be provided from snoop queue circuitry 44 to arbiter 42 to request access to cache 42 for a current snoop address corresponding to a next snoop request in snoop request queue 46.

In one embodiment, anytime there is a pending snoop request, arbiter 42 provides the snoop address of this pending snoop request to cache 28, even if an access request from processing circuitry 40 to arbiter 42 is pending. That is, if there is a pending snoop request, arbiter 42 will always assign priority to the pending snoop request, regardless of any pending requests from processing circuitry 40. Alternatively, other arbitration schemes may be utilized. If arbiter 42 heavily prioritizes pending snoop requests, processing circuitry 40 (and thus processor 14) may be caused to stall too much, thus negatively impacting performance. In one embodiment, arbiter 42 provides the signal p_cac_stalled to indicate when processing circuitry 40 (and thus processor 14) has been prevented from accessing cache 28. In one embodiment, this signal is asserted (set to a logic level 1 in this embodiment) when arbiter 42 has given priority to a pending snoop request to access cache 28 and yet there is a pending access request from processing circuitry 40. That is, the p_cac_stalled signal may be asserted in response to each failed access to cache 28 via arbiter 42 by processing circuitry 40. In one embodiment, the p_cac_stalled signal is provided to cache coherency manager 18 which uses the signal to determine when processing circuitry 40 (and thus processor 14) has been prevented from accessing cache 28 for more than a predetermined amount of time (i.e. for more than a threshold amount of time). Operation of cache coherency manager 18 will be discussed in more detail below.

As illustrated in FIG. 3, the p_cac_stalled signal is included as part of the snoop control interface. In this illustrated embodiment, the snoop control interface also includes a snoop request signal interface and a snoop status signal interface. Alternatively, other or different signals may be included, such as, for example, a snoop acknowledgement signal interface, a snoop error signal interface, etc.

In one embodiment, the snoop request signal interface includes a request signal line for indicating that a snoop request is being made, a snoop command line indicating a command to be performed in response to the type of bus transaction that generated the snoop, a snoop address line which is the address of the transaction being snooped, and a snoop request ID line, which is a number generated by the cache coherency manager identifying the snoop request. These signal lines may be multi-bit (either in parallel or serial in some embodiments) or single bit in some embodiments.

The snoop status signal interface is used to indicate to the cache coherency manager 18 that a snoop request has been processed by the cache and the result of the cache snoop (e.g. whether an entry for the data address was found in the cache or not or whether an error (parity or other type) was found with the data of the entry). In one embodiment, the snoop status interface includes a snoop response line and a snoop request ID line indicating the ID number of the snoop request. These lines may be multi-bit as well.

In other embodiments, system 10 may include processors of other configurations and/or that perform transactions and snoop operations in a different manner. For example, a processor may have other circuitry not shown in FIG. 3 or may not include all of the circuitry shown in FIG. 3. Also, a processor may include other circuitry for handling snoop requests in another manner as well.

Figure 4:
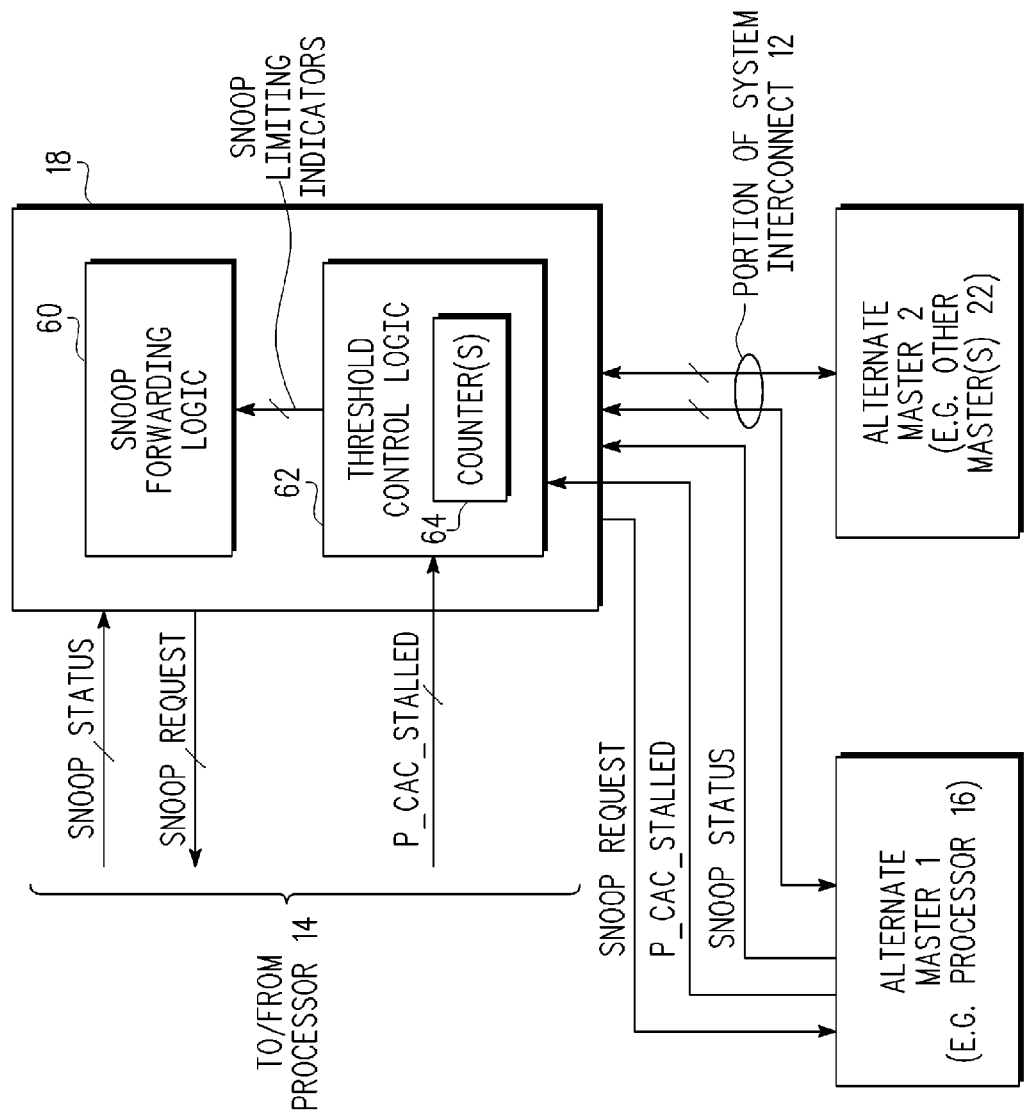
FIG. 4 is a block diagram of a portion of a cache coherency manager according to one embodiment of the present invention.

FIG. 4 illustrates a block diagram of one embodiment of cache coherency manager 18, a portion of system interconnect 12, an alternate master 1, and an alternate master 2. Cache coherency manager 18 includes threshold control logic 62 which receives the p_cac_stalled signal from processor 14 and generates a corresponding snoop limiting indicator. Threshold control logic 62 also receives the p_cac_stalled signal from alternate master 1 and generates a corresponding snoop liming indicator. Cache coherency manager 18 also includes snoop forwarding logic 60 which generates snoop requests to processor 14 and alternate master 1 based on transactions occurring on system interconnect 12, such as from alternate master 1 or alternate master 2. Snoop forwarding logic 60 also receives the snoop limiting indicators corresponding to each of processor 14 and alternate master 1. In response to a snoop limiting indicator being asserted, snoop forwarding logic 60 limits, delays, or prevents snoop requests which are generated or provided to the corresponding master (i.e. processor 14 or alternate master 1). Note that in one embodiment, alternate master 1 may refer to processor 16 of FIG. 1 and alternate master 2 may refer to any of other master(s) 22 of FIG. 1, where processor 16 include cache 30 and thus also includes snoop circuitry and a snoop control interface as is the case with processor 14 and where alternate master 2 does not include a cache and thus does not need to include any snoop circuitry nor a snoop control interface with cache coherency manager 18.

The snoop limiting indicator corresponding to processor 14, when asserted, indicates to snoop forwarding logic that processing circuitry 40 within processor 14 has been stalled more than a predetermined amount of time and that no more snoop requests should be provided to processor 14 for a period of time. There are various ways in which snoop forwarding logic may limit or prevent providing snoop requests to processor 14. In one embodiment, logic within cache coherency manager 18 may stall particular accesses on system interconnect 12 which result in snooping activating for processor 14. For example, certain global writes, such as to memory 20, may be limited or prevented or stalled. Alternatively, logic within cache coherency manager 18 may internally store or queue up snoop requests for processor 14. In another embodiment, cache coherency manager 18 may indicate to system transaction arbiter 32 that one or more specific masters should be temporarily blocked from initiating transactions requiring snoop lookups. Other alternate embodiments may use other methods for preventing providing snoop requests to processor 14. (Note that the same or similar methods may be used to prevent providing snoop requests to alternate master 1 when the corresponding snoop limiting indicator for alternate master 1 indicates that alternate master 1 has been stalled more than a predetermined amount of time.) By not providing more snoop requests to processor 14, processor 14 is able to consume any remaining pending snoop requests and, with no more pending snoop requests, can then begin to process access requests from processing circuitry 40. That is, once arbiter 42 no longer receives more pending snoop requests from snoop queue circuitry 44 (or from snoop control 54 if no snoop queue is present), arbiter 42 would be able, according to its protocol, to provide access requests from processing circuitry 40 to cache 28. In one embodiment, snoop forwarding logic 60 is prevented from providing snoop requests to processor 14 for a predetermined amount of time. Other variations and alternatives will be discussed below in reference to the timing diagrams of FIGS. 5-8.

Threshold control logic 62 may use a variety of different methods to determine whether a master, such as processor 14, has been stalled (i.e. prevented from accessing cache 28) for more than a predetermined amount of time. In the descriptions that follow, processor 14 and its corresponding p_cac_stalled signal and its corresponding snoop limiting indicator will be discussed as an example. However, the discussions which follow may apply to any master within system 10. In one embodiment, the corresponding snoop limiting indicator for processor 14 is asserted when processing circuitry 40 has been prevented from accessing cache 28 for a predetermined number of data processing cycles. (Note that the predetermined number of data processing cycles may also be expressed as a predetermined amount of time). In one embodiment, the corresponding snoop limiting indicator is asserted when processor 40 has been prevented from accessing cache 28 for at least a predetermined number of data processing cycles over a predetermined time period. That is, in one embodiment, the corresponding snoop limiting indicator is asserted when processing circuitry 40 has been stalled for at least A cycles over a period of X cycles.

FIGS. 5-8 illustrate different examples of using p_cac_stalled to determine when processor 14 has been prevented from accessing cache 28 for more than a threshold amount of time. In FIGS. 5-8, when PRC_REQ is asserted (e.g. at a logic level 1), it indicates there is a pending access from processing circuitry 40 to cache 28. When SNP_REQ is asserted (e.g. at a logic level 1), it indicates that a new snoop request is received by snoop control 54 from snoop forwarding logic 60. When SNP_PEND is asserted (e.g. at a logic level 1), it indicates that there is a pending snoop request (e.g. from snoop queue 46 or directly from snoop control 54 when no snoop queue is present) for access to cache 28. When PRIORITY is asserted (e.g. at a logic level 1), it indicates that arbiter 42 has prioritized a pending snoop request for processing, thus selecting the pending snoop request to provide to cache 28. When p_cac_stalled is asserted (e.g. at a logic level 1), it indicates that processing circuitry 40 has been stalled (i.e. prevented from accessing cache 28). In one embodiment, p_cac_stalled can be represented as the logical ANDing between PRC_REQ and PRIORITY, such that a processor stall is indicated when there is a pending access from processing circuitry 40 to cache 28 and yet arbiter 42 has selected the pending snoop request to access cache 28. Also, note that durations or amounts of time described herein (such as with respect to the examples of FIGS. 5-8) can be expressed as time or as a number of data processing cycles. For example, intervals of time can also be expressed as intervals of a particular number of data processing cycles. In one embodiment, a data processing cycle refers to a clock cycle within the processor or within the system.

Figure 5:
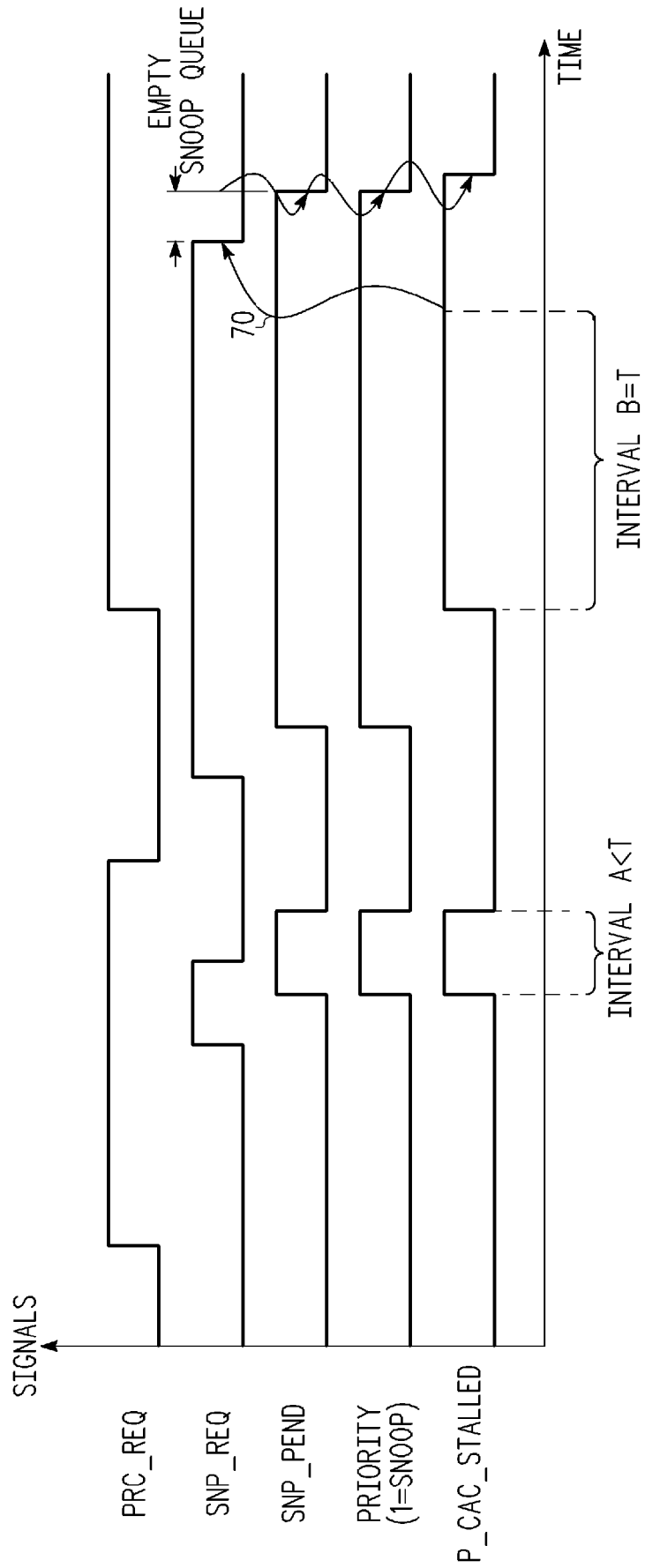
FIGS. 5-8 are timing diagrams according to various examples of the present invention.

Referring to FIG. 5, interval A during which p_cac_stalled is asserted is less than a predetermined duration of time, T. Since it is less than the threshold time, T, processing continues normally. However, p_cac_stalled is again asserted after interval A (and thus beginning interval B) when more snoop requests are received (SNP_REQ is asserted) and have requested cache access (SNP_PEND becomes asserted). During interval B, there are pending snoops for arbiter 42 to select (SNP_PEND is asserted). However, once processor 14 has been stalled for the threshold amount of time, T, (i.e. once interval B reaches T), the SNP_REQ signal is deasserted, as indicated by arrow 70. That is, as described above, when processor 14 has been stalled for the threshold amount of time, T, the corresponding snoop limiting indicator is asserted such that snoop forwarding logic 60 stops providing more snoop requests to processor 14 (as indicated by the deassertion of the SNP_REQ signal). Although no new snoop requests are being received by processor 14, snoop queue 46 may still include pending snoop requests. Once these remaining snoop requests are processed (i.e. provided to cache 28 by arbiter 42 for snoop look-up) and snoop queue 46 is empty, SNP_PEND is deasserted. In response to deassertion of SNP_PEND, arbiter 42 can select pending requests from processing circuitry 40 to access cache 28, as indicated by the deassertion of PRIORITY. Since there are no pending snoop requests and arbiter 42 is servicing requests from processing circuitry 40, processing circuitry 40 is no longer stalled, thus p_cac_stalled is deasserted. Note that p_cac_stalled is deasserted after interval B reached T, and after any remaining requests in snoop queue 46 were processed.

Figure 6:
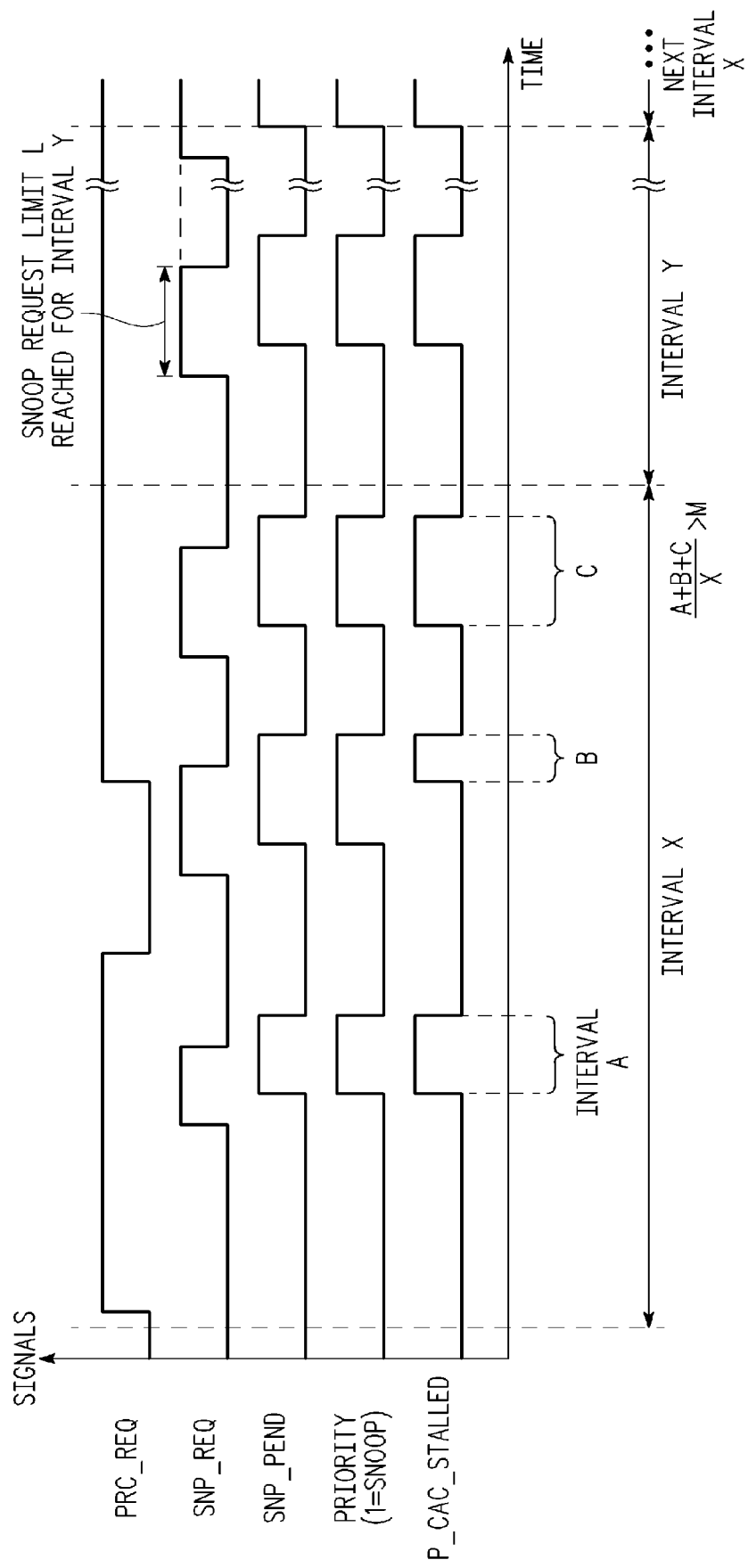

Referring to FIG. 6, the corresponding snoop limiting indicator is not asserted until a predetermined amount of time or number of data processing cycles has been reached over a predetermined time period or interval, X. That is, in FIG. 6, a threshold M is used which represents the maximum amount of time over a predetermined interval (or duration of time), X, that processor 14 can be stalled while waiting to access the cache. For example, M can be expressed as a percentage or fraction indicating the maximum amount of time within the interval that processor 24 can be stalled. For example, M may be set to 50%, 70%, or any percentage as needed for processor 14. Furthermore, in one embodiment, the value of M may be modified dynamically during operation of processor 14. Therefore, in one embodiment, by integrating over time, an average amount of time that processor 14 is denied access to cache 28 can be obtained and compared against a threshold, such as M.

Referring back to FIG. 6, p_cac_stalled is asserted for intervals A, B, C, where during each of intervals A, B, C, both PRC_REQ and PRIORITY are asserted. Therefore, within interval X, processor 14 was stalled (i.e. prevented from accessing cache 28) for a total of "A+B+C" amount of time over an "X" amount of time. Therefore, the amount of time or the number of data processing cycles over interval X can be expressed as "(A+B+C)/X", where, in the example of FIG. 6, this is greater than M for interval X. Therefore, the amount of time of processor stall was unacceptable, and during a next period of time or interval, Y, the snoop requests are limited to a time, L. That is, during interval Y, snoop requests are only allowed to be provided to processor 14 from cache coherency manager 18 for up to an amount of time, L (or, if L represents a number of cycles, up to a number of data processing cycles, L). Once this limit, L, is reached, snoop requests are no longer provided to processor 14, even though, as illustrated by the dotted line following negation of SNP_REQ in interval Y, there are more snoop requests that could be sent. That is, if no limit, L, were present, snoop request would continue throughout the duration of interval Y, where SNP_REQ would remain asserted and not be negated as done in FIG. 6. Upon negation of SNP_REQ in interval Y, eventually, SNP_PEND is negated indicating that no more snoop requests remain in the snoop queue for processing. At this point, PRIORITY is negated indicating that arbiter 42 is selecting access addresses from processing circuitry 40 to provide to cache 28. Thus, p_cac_stalled is also negated after PRIORITY is negated. Upon completion of interval Y, or a short time prior to the completion of interval Y. SNP_REQ can be reasserted so as to allow the continued processing of snoop requests to processor 14.

Figure 7:
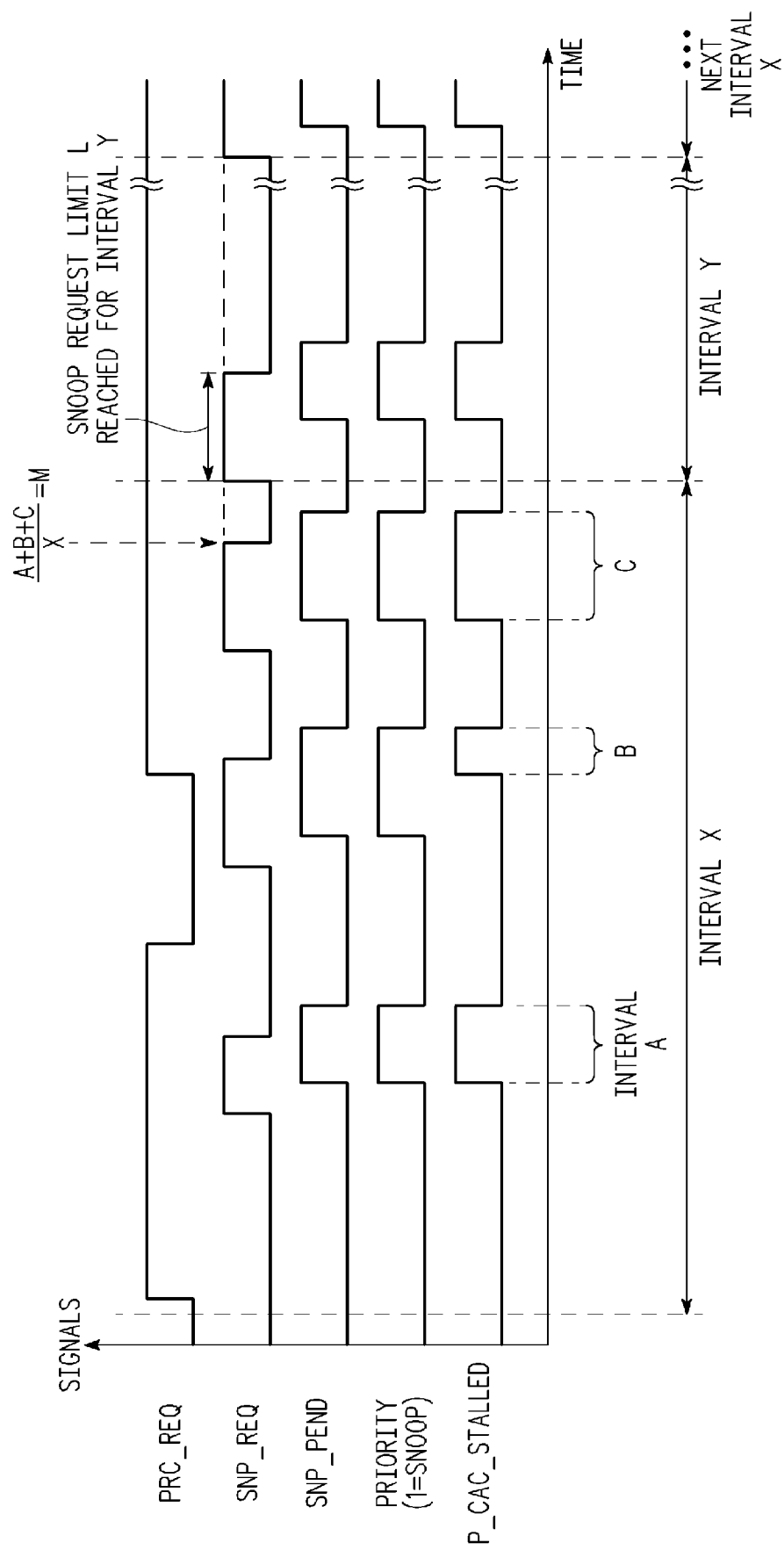

FIG. 7 is similar to FIG. 6. However, in FIG. 7, rather than allowing snoop requests to occur as needed during interval X, and determining, at the end of interval X, whether the duration of intervals A, B, and C surpassed M before beginning interval Y, upon "(A+B+C)/X" reaching the threshold M, SNP_REQ is immediately negated, even though there are more snoop requests which could be sent. Therefore, in the embodiment of FIG. 7, the amount of time that processor 14 is allowed to remain stalled over interval X is not surpassed, and the load balancing by limiting snoop requests begins occurring at the moment M is reached. This is unlike FIG. 6, where, upon completion of interval X, it was determined that "(A+B+C)/X" exceeded M; however, at the point at which it exceeded M, SNP_REQ was not negated. The load balancing by limiting snoop requests does not begin until the following interval, interval Y in FIG. 6. In FIG. 7, at the start of interval Y, snoop requests are again allowed, as indicated by the assertion of SNP_REQ. However, since the threshold M was reached during interval X, snoop requests are limited in interval Y to a limit of L. Therefore, upon reaching this limit, L, SNP_REQ is again negated, even though there are more snoop request that could be sent to processor 14, as indicated by the dotted line in interval Y after the negation of SNP_REQ. Upon completion of interval Y, SNP_REQ can be reasserted so as to allow the continued processing of snoop requests to processor 14.

Figure 8:
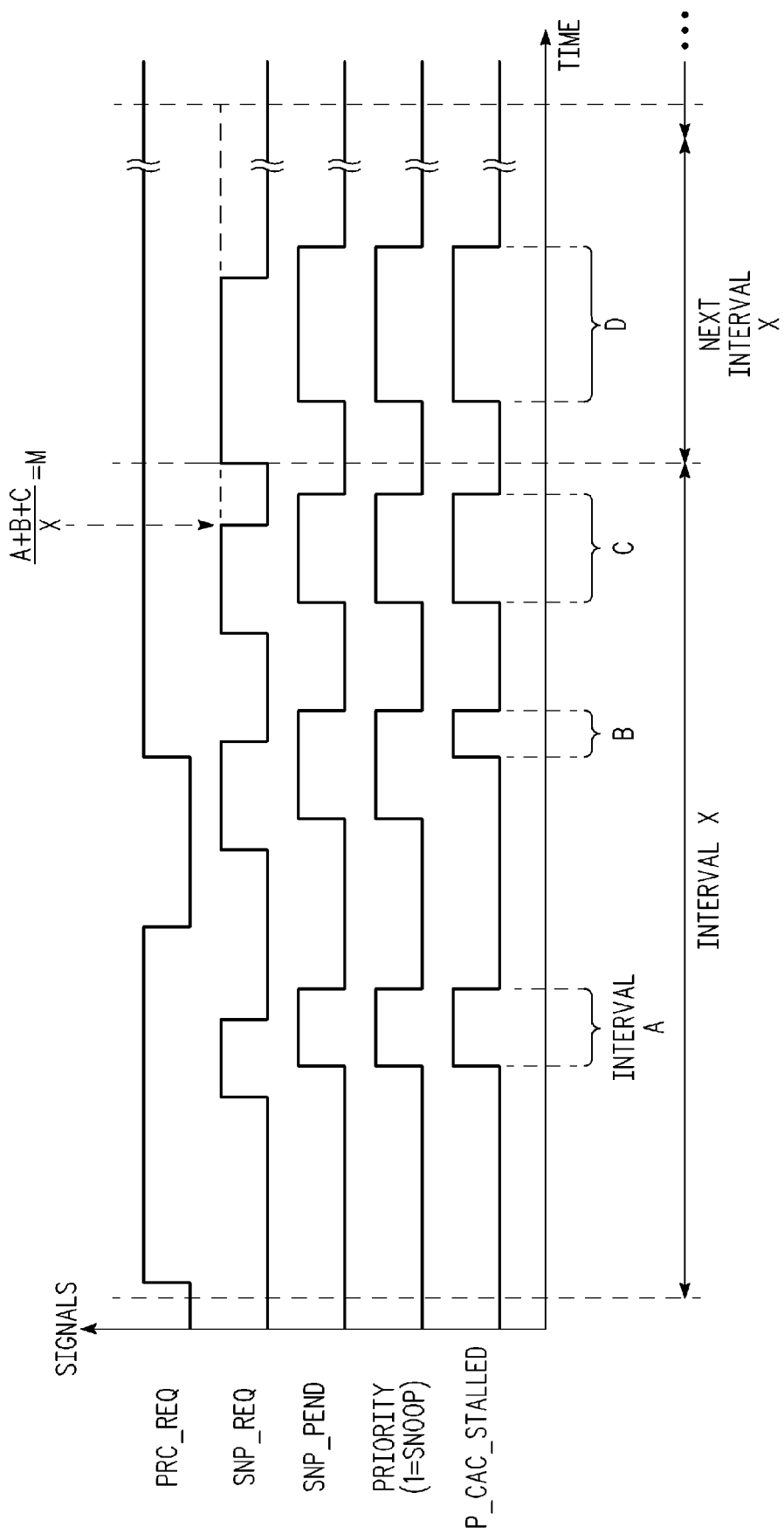

FIG. 8 is similar to FIG. 7; however, an interval Y (which uses a more stringent limit, L, on snoop requests) is not used. That is, the first interval X in FIG. 8 is the same as the first interval X of FIG. 7. Therefore, once "(A+B+C)/X" reaches M, SNP_REQ is negated, as was described above, even though more snoop requests are available to send to processor 14. However, after the completion of interval X in FIG. 8, a next interval X is immediately started in which again the time during which p_cac_stalled is asserted is again monitored to determine when it, within the next interval X, exceeds M. In the example of FIG. 8, "D/X=M", therefore, upon "D/X" reaching M, SNP_REQ is deasserted. Therefore, in the examples of FIGS. 6 and 7, once a threshold was exceeded for processor 14 being stalled, a special interval (interval Y) followed the current interval (interval X) in which snoop requests were limited by limit, L, as described above. However, in the example of FIG. 8, the same processing is done in each interval, where M is used in each interval, and thus there is no use of a special interval with a limit, L.

Note that the threshold values described above, such as T, M, and L, can be stored anywhere within cache coherency manager 18, processor 14, or system 10. In one embodiment, they can be dynamically altered during operation or from one interval to the next. They may be dynamically altered based on a variety of factors. For example, cache coherency manager 18 can monitor the p_cac_stalled signals of other processors or masters to determine how to alter one or more thresholds of processor 14. Cache coherency manager 18 can also monitor other aspects of system activity to determine how to alter one or more thresholds of a processor or master. Cache coherency manager 18 can also use data from previous intervals (e.g. previous intervals X or Y) to affect the threshold values for future intervals. Also, note that the predetermined interval durations, such as X and Y, can also be stored and altered during operation based on previous intervals or system activity, or combinations thereof.

Therefore, in one embodiment, accesses to cache 28 are monitored to determine if processing circuitry 40 (and thus processor 14) is prevented from accessing the cache for more than a threshold amount of time. Various examples of this determination are discussed above, using such thresholds as T, M, and L. Based on this determination, a signal, such as a snoop limiting indicator, can be generated which indicates when processing circuitry 40 (and thus processor 14) has been prevented form accessing cache 28 for more than the threshold amount of time. In one embodiment, the snoop limiting indicator is generated in response to determining that processing circuitry 40 (and thus processor 14) has been prevented form accessing cache 28 for a predetermined number of data processing cycles. In one embodiment, the snoop limiting indicator is also generated in response to determining that processing circuitry 40 (and thus processor 14) has been prevented from accessing cache 28 for at least a predetermined number of data processing cycles over a predetermined time period (e.g. interval X). In one embodiment, the predetermined number of data processing cycles can be dynamically altered in response to system activity within data processing system 10. In one embodiment, the predetermined number of data processing cycles for use in a second time period (e.g. interval Y or a next interval X) subsequent to the predetermined time period can be dynamically altered in response to a previous value of the number of data processing cycles that the processing circuitry 40 was prevented from accessing cache 28 during the predetermined time period (e.g. interval X).

Alternate embodiments may use other ways to determine, using p_cac_stalled, whether processor 14 has been overly stalled (i.e. overly prevented from accessing cache 28). In one embodiment, the selected method or methods for using p_cac_stalled to determine whether processor 14 has been overly stalled may be implemented within cache coherency manager 18, such as within threshold control logic 62. The intervals of X and Y can be, for example, implemented with counters, such as counters 64 in threshold control logic 62. However, alternate embodiments may use different cache coherency logic to implement the selected method for determining when snoop requests are to be limited or prevented, and how to do so. Also, in one embodiment, the thresholds discusses above can be stored within cache coherency manager 18, such as within threshold control logic 62, or may be stored elsewhere within processor 14 or system 10. Likewise, in one embodiment, the snoop limiting indicators and/or threshold control logic 62 may be implemented within processor 14, or elsewhere within system 10.

Therefore, it can now be understood how a signal, such as the p_cac_stalled signal may be used to ensure that the performance of a processor is not overly negatively impacted by snoop requests. The p_cac_stalled signal may, for example, be used to determine when load balancing needs to occur to limit or prevent snoop requests to the processor.

Because the various apparatus implementing the present invention are, for the most part, composed of electronic components and circuits known to those skilled in the art, circuit details have not been explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary memory system architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 10 is implemented in a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the invention is described herein with reference to specific embodiments, various modifications and changes can be made without departing from the scope of the present invention as set forth in the claims below. For example, any type of memory cache, synchronous or asynchronous, may be used. Various types of memory circuits including dynamic random access memory (DRAM), synchronous random access memory (SRAM), magnetoresistive random access memory (MRAM), FLASH, shift registers and addressable storage registers may be used to implement the cache. Various system interconnect or bus protocols could be implemented. In other embodiments system components in addition to those used in FIG. 1 may be provided. It should be understood that all circuitry described herein may be implemented either in silicon or another semiconductor material or alternatively by software code representation of silicon or another semiconductor material. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements. Accordingly, the specification and figures are to be regarded in an illustrative rather than a restrictive sense, and all such modifications are intended to be included within the scope of the present invention.

The following are various embodiments of the present invention.

Item 1 includes a method which includes arbitrating access to a cache between access requests from first processing circuitry and snoop requests resulting from a transaction performed by second processing circuitry; monitoring accesses to the cache to determine if the first processing circuitry is prevented from accessing the cache for more than a threshold amount of time; and generating a signal to indicate when the first processing circuitry has been prevented from accessing the cache for more than the threshold amount of time. Item 2 includes the method of item 1 and further includes generating the signal in response to determining that the first processing circuitry has been prevented from accessing the cache for a predetermined number of data processing cycles. Item 3 includes the method of item 2 and further includes generating the signal also in response to determining that the first processing circuitry has been prevented from accessing the cache for at least the predetermined number of data processing cycles over a predetermined time period. Item 4 includes the method of item 3 and further includes dynamically altering the predetermined number of data processing cycles in response to system activity within a data processing system comprising the cache, first processing circuitry and second processing circuitry. Item 5 includes the method of item 1 and further includes generating the signal also in response to determining that the first processing circuitry has been prevented from accessing the cache for at least a predetermined number of data processing cycles over a predetermined time period. Item 6 includes the method of item 5 and further includes dynamically altering the predetermined number of data processing cycles for use in a second time period subsequent to the predetermined time period in response to a previous value of a number of data processing cycles that the first processing circuitry is prevented from accessing the cache during the predetermined time period. Item 7 includes the method of item 1 and further includes, in response to generating the signal, preventing snoop requests to the cache for a predetermined amount of time. Item 8 includes the method of item 1 and further includes, in response to generating the signal, limiting snoop requests to a predetermined amount of time during a timeframe of predetermined duration subsequent to generating the signal. Item 9 includes the method of item 1 and further includes generating a second signal for indicating when the second processing circuitry has been prevented from accessing the cache for more than the threshold amount of time.

Item 10 includes a system which includes a first master and a second master coupled via a system interconnect, where the first master includes a cache memory; first processing circuitry coupled to the cache memory; and an arbiter coupled to the first processing circuitry and the cache memory, the arbiter arbitrating access to the cache memory between access requests from the first master and snoop requests resulting from a transaction performed by the second master, the arbiter generating a signal to indicate when the first master has been prevented from accessing the cache memory. The system of item 10 further includes coherency logic coupled to the first master and the second master, the coherency logic using the signal to indicate when the first master has been prevented from accessing the cache memory for more than a predetermined amount of time. Item 11 includes the system of item 10 where the coherency logic uses the signal to determine that the first master has been prevented from accessing the cache memory for a predetermined number of data processing cycles. Item 12 includes the system of item 11, where the coherency logic uses the signal also to determine that the first master has been prevented from accessing the cache memory for at least a predetermined number of data processing cycles over a predetermined time period. Item 13 includes the system of item 11, where the coherency logic dynamically alters the predetermined number of data processing cycles in response to system activity within the system. Item 14 includes the system of item 11, where the coherency logic uses the signal to determine that the first master has been prevented from accessing the cache memory for at least a predetermined number of data processing cycles over a predetermined time period. Item 15 includes the system of item 11, where the coherency logic dynamically alters the predetermined number of data processing cycles for use in a second time period subsequent to the predetermined time period in response to a previous value of the predetermined number of data processing cycle. Item 16 includes the system of item 11, where the coherency logic prevents snoop requests from the second master to the cache memory for a predetermined amount of time in response to receiving the signal. Item 17 includes the system of item 11, where the second master generates a second signal for indicating when the second master has been prevented from accessing the cache memory, the cache memory limiting cache accesses from the first master when the second master has been prevented from accessing the cache memory for more than a second predetermined amount of time.

Item 18 includes a method which includes arbitrating access to a cache between access requests from a first master and a second master; monitoring accesses to the cache to determine if the first master is prevented from accessing the cache and asserting a first signal in response to each failed access of the cache by the first master; using the first signal to determine if the first master has been denied access to the cache for more than a threshold amount of time; and generating a second signal to indicate when the first master has been denied access to the cache for more than the threshold amount of time. Item 19 includes the method of item 18 and further includes generating the second signal by: (1) integrating over time to obtain an average amount of time the first master is denied access to the cache; and (2) asserting the second signal when the average amount of time exceeds the threshold amount of time. Item 20 includes the method of item 18 and further includes generating the second signal by counting a number of times that the first signal is asserted and asserting the second signal when the number of times exceeds a number correlated to the threshold amount of time.

What is claimed is:

1. A method comprising:
   arbitrating access to a cache between access requests from first processing circuitry and snoop requests resulting from a transaction performed by second processing circuitry;
   monitoring accesses to the cache to determine if the first processing circuitry is prevented from accessing the cache for more than a threshold amount of time; and
   generating a signal to indicate when the first processing circuitry has been prevented from accessing the cache for more than the threshold amount of time.

2. The method of claim 1 further comprising:
   generating the signal in response to determining that the first processing circuitry has been prevented from accessing the cache for a predetermined number of data processing cycles.

3. The method of claim 2 further comprising:
   generating the signal also in response to determining that the first processing circuitry has been prevented from accessing the cache for at least the predetermined number of data processing cycles over a predetermined time period.

4. The method of claim 3 further comprising:
   dynamically altering the predetermined number of data processing cycles in response to system activity within a data processing system comprising the cache, first processing circuitry and second processing circuitry.

5. The method of claim 1 further comprising:
   generating the signal also in response to determining that the first processing circuitry has been prevented from accessing the cache for at least a predetermined number of data processing cycles over a predetermined time period.

6. The method of claim 5 further comprising:

dynamically altering the predetermined number of data processing cycles for use in a second time period subsequent to the predetermined time period in response to a previous value of a number of data processing cycles that the first processing circuitry is prevented from accessing the cache during the predetermined time period.

7. The method of claim 1 further comprising:

in response to generating the signal, preventing snoop requests to the cache for a predetermined amount of time.

8. The method of claim 1 further comprising:

in response to generating the signal, limiting snoop requests to a predetermined amount of time during a timeframe of predetermined duration subsequent to generating the signal.

9. The method of claim 1 further comprising:

generating a second signal for indicating when the second processing circuitry has been prevented from accessing the cache for more than the threshold amount of time.

10. A system comprising:

a first master and a second master coupled via a system interconnect, the first master comprising:
  a cache memory;
  first processing circuitry coupled to the cache memory; and
  an arbiter coupled to the first processing circuitry and the cache memory, the arbiter arbitrating access to the cache memory between access requests from the first master and snoop requests resulting from a transaction performed by the second master, the arbiter generating a signal to indicate when the first master has been prevented from accessing the cache memory;

the system further comprising:

coherency logic coupled to the first master and the second master, the coherency logic using the signal to indicate when the first master has been prevented from accessing the cache memory for more than a predetermined amount of time.

11. The system of claim 10 wherein the coherency logic uses the signal to determine that the first master has been prevented from accessing the cache memory for a predetermined number of data processing cycles.

12. The system of claim 11 wherein the coherency logic uses the signal also to determine that the first master has been prevented from accessing the cache memory for at least a predetermined number of data processing cycles over a predetermined time period.

13. The system of claim 11 wherein the coherency logic dynamically alters the predetermined number of data processing cycles in response to system activity within the system.

14. The system of claim 11 wherein the coherency logic uses the signal to determine that the first master has been prevented from accessing the cache memory for at least a predetermined number of data processing cycles over a predetermined time period.

15. The system of claim 11 wherein the coherency logic dynamically alters the predetermined number of data processing cycles for use in a second time period subsequent to the predetermined time period in response to a previous value of the predetermined number of data processing cycles.

16. The system of claim 11 wherein the coherency logic prevents snoop requests from the second master to the cache memory for a predetermined amount of time in response to receiving the signal.

17. The system of claim 11 wherein the second master generates a second signal for indicating when the second master has been prevented from accessing the cache memory, the cache memory limiting cache accesses from the first master when the second master has been prevented from accessing the cache memory for more than a second predetermined amount of time.

* * * * *